Patented Dec. 15, 1925.

1,565,894

UNITED STATES PATENT OFFICE.

EMILE BINDSCHEDLER, OF LANSDOWNE, PENNSYLVANIA, AND EDWARD W. RUGELEY, OF HOPEWELL, VIRGINIA, ASSIGNORS OF THEIR ENTIRE RIGHT TO TUBIZE ARTIFICIAL SILK COMPANY OF AMERICA, A CORPORATION OF DELAWARE.

METHOD OF MANUFACTURING HYDROGEN SULPHIDE GAS.

No Drawing. Application filed April 15, 1924. Serial No. 706,716.

*To all whom it may concern:*

Be it known that we, EMILE BINDSCHEDLER, a citizen of the Republic of Switzerland, and resident of Lansdowne, in the county of Delaware, in the State of Pennsylvania, and EDWARD W. RUGELEY, a citizen of the United States of America, and resident of Hopewell, county of Prince George, State of Virginia, have invented certain new and useful Improvements in Methods of Manufacturing Hydrogen Sulphide Gas, of which the following is a true and exact description.

Our invention relates to an economic production of hydrogen sulphide gas in a state of great purity so that it will be suitable for the manufacture of sulphhydrates used in denitrating nitrocellulose silk.

Our process is based on the known reaction of generating hydrogen sulphide gas by heating sulphur with tar oil or petroleum products like Mexican crude oil, heavy petroleum oil, paraffin oil and asphalt.

If sulphur is, for instance, heated with heavy fuel oil, which is especially well adapted for the purpose; the generation of hydrogen sulphide gas starts already at a relatively low temperature around 125° C., and proceeds rather rapidly between 200 and 300° C. When the heated mixture attains a temperature of about 200° C., cracking of the oils occurs and while the resultant vaporized products such as gasoline and kerosene can be condensed and recovered in any convenient way, we prefer to carry out the process under reflux so that these hydrocarbons are condensed and returned to the heated vessel containing the mixture under treatment so as to make them available for reaction with sulphur. This reflux reaction has also the advantage of carrying back any vaporized sulphur which otherwise would sublime over. The effect of carrying out our process under reflux enables us to use proportions of one part of sulphur to about .875 of oils without impairing the yield of hydrogen sulphide gas.

In order to complete the reaction and to obtain the highest possible yield, we found it necessary to raise the temperature of the mixture of sulphur and hydrocarbon oils to nearly 400° C. We have now found that when the temperature reaches about 350° C. mercaptane compounds of an obnoxious odor are formed contaminating the hydrogen sulphide gas. If the latter is introduced, for instance, into sodium sulphide solution, caustic soda lye or milk of lime for the purpose of making sulphhydrates, the obnoxious odor pertains to the solution and makes it not only very unpleasant to handle, but almost unfit for use in denitrating nitrocellulose silk.

We have now discovered that hydrogen sulphide gas can be purified from these mercaptane products by passing it through certain materials of high absorptive capacity like silica gel, activated carbon, coke or charcoal. These materials absorb the mercaptane compounds leaving only pure hydrogen sulphide gas which when introduced into appropriate absorption liquids, yields sulphhydrate solutions of great purity and free from any obnoxious odor. Charcoal is very well adapted for the purpose and has the advantage over other materials of being very cheap.

The following are two examples of the practical employment of our process:

First. 1,000 pounds sulphur and 1,500 pounds heavy Mexican fuel oil are mixed in an iron kettle provided with a stirring arrangement and gradually heated until a temperature of 400° C. is reached and the generation of hydrogen sulphide gas ceases. During the reaction about 500 pounds of gasoline and kerosene products distill over and are condensed by cooling. The hydrogen sulphide gas passes first through a container with cracked oil to retain sulphur and then through one or several cooled containers filled with charcoal and is afterwards either liquefied or worked up into sulphhydrate solutions according to well known methods. After the charcoal has lost its absorptive capacity for the mercaptane impurities, it can be reactivated by superheated steam. Coke formed as a by-product during the reaction between hydrocarbon oils and sulphur is obtained in high purity in pulverized form and can easily be removed from the kettle and used for the making of bricks, by mixing it with crude oil or asphalt and pressing it or for making of producer gas or as such for reduction purposes or otherwise.

Second. 875 pounds of crude oil previously heated to 200° C. are loaded in an iron kettle provided with stirring arrangement and a reflux condenser or air cooler with baffle plates. 1,000 pounds of molten sulphur are then gradually introduced and the temperature of the mixture raised until it reaches 400° C. and the generation of hydrogen sulphide gas ceases. The latter passes through a tower filled with activated carbon under cooling and is then liquefied or introduced into a suitable absorption liquid in case the manufacture of sulphhydrate solutions is intended.

Having now described our invention, what we claim as new and desire to secure by Letters Patent, is:

1. The method of manufacturing hydrogen sulphide gas which consists in heating a mixture of hydrocarbon oils and sulphur and purifying the hydrogen sulphide gas evolved by this treatment by passing it through a material of high absorptive capacity.

2. The method of manufacturing hydrogen sulphide gas which consists in heating a mixture of hyrdocarbon oils and sulphur under reflux to prevent cracked oil products from distilling over and purifying the hydrogen sulphide gas evolved by this treatment by passing it through a material of high absorptive capacity.

3. The method of manufacturing hydrogen sulphide gas which consists in heating a mixture of hydrocarbon oils and sulphur at a temperature between 200° and 400° C. and purifying the hydrogen sulphide gas evolved by this treatment by passing it through a material of high absorptive capacity.

4. The method of manufacturing hydrogen sulphide gas which consists in heating a mixture of hydrocarbon oils and sulphur and purifying the hydrogen sulphide gas evolved by this treatment by passing it through a carbonaceous material of high absorptive capacity.

5. The method of manufacturing hydrogen sulphide gas which consists in heating a mixture of petroleum oils and sulphur under reflux to prevent cracked oil products from distilling over and purifying the hydrogen sulphide gas evolved by this treatment by passing it through a material of high absorptive capacity.

6. The method of manufacturing hydrogen sulphide gas which consists in heating a heavy fuel oil to a temperature of about 200° C., gradually introducing sulphur into the heated oil in about the proportion of one part of sulphur to from .8 to 1.2 parts of oil, raising the temperature of the mixture to from about 350° to 400° C. under reflux and purifying the hydrogen sulphide gas evolved by passing it through carbonaceous material of high absorptive capacity.

7. In the method of claim 1, the use of charcoal under cooling as the absorbent material.

8. In the method of claim 6, the use of charcoal under cooling as the absorbent material.

EMILE BINDSCHEDLER.
EDWARD W. RUGELEY.